(12) United States Patent
Watarai

(10) Patent No.: US 7,654,546 B2
(45) Date of Patent: Feb. 2, 2010

(54) BICYCLE WHEEL SECURING STRUCTURE

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 273 days.

(21) Appl. No.: 11/830,136

(22) Filed: Jul. 30, 2007

(65) Prior Publication Data

US 2008/0197602 A1 Aug. 21, 2008

Related U.S. Application Data

(63) Continuation-in-part of application No. 11/676,052, filed on Feb. 16, 2007.

(51) Int. Cl.
*B62K 21/02* (2006.01)
(52) U.S. Cl. .................... 280/279; 280/288.4; 280/260; 301/124.2
(58) Field of Classification Search ................. 280/279, 280/260, 288.4; 301/124.1, 124.2, 279, 260, 301/288.4
See application file for complete search history.

(56) References Cited

U.S. PATENT DOCUMENTS

| | | | | |
|---|---|---|---|---|
| 5,673,925 | A * | 10/1997 | Stewart | 280/279 |
| 5,997,104 | A * | 12/1999 | Campagnolo | 301/110.5 |
| 6,089,675 | A | 7/2000 | Schlanger | |
| 6,409,281 | B1 * | 6/2002 | Kanehisa et al. | 301/110.5 |
| 6,572,199 | B1 * | 6/2003 | Creek et al. | 301/124.1 |
| 6,659,489 | B2 * | 12/2003 | Masui et al. | 280/304.3 |
| 7,503,213 | B2 * | 3/2009 | Campbell | 73/488 |
| 2002/0070604 | A1 * | 6/2002 | Kanehisa | 301/110.5 |
| 2004/0149076 | A1 | 8/2004 | Yamanaka | |
| 2004/0169418 | A1 * | 9/2004 | Kanehisa et al. | 301/124.2 |
| 2008/0197600 | A1 * | 8/2008 | Watarai | 280/279 |
| 2008/0211296 | A1 * | 9/2008 | Takachi | 301/124.2 |
| 2008/0284127 | A1 * | 11/2008 | Watarai | 280/279 |
| 2009/0115241 | A1 * | 5/2009 | Kanehisa | 301/124.2 |

FOREIGN PATENT DOCUMENTS

| | | |
|---|---|---|
| FR | 893959 | 12/1944 |
| FR | 983137 | 6/1951 |
| GB | 2 345 893 A | 7/2000 |

* cited by examiner

*Primary Examiner*—Lesley Morris
*Assistant Examiner*—Tashiana Adams
(74) *Attorney, Agent, or Firm*—Global IP Counselors, LLP

(57) ABSTRACT

A bicycle wheel securing structure includes an adapter, an axial retaining arrangement and a holding member. The adapter is configured and arranged to be mounted in an axle mounting opening of a bicycle fork and has an axial bore that is at least partially threaded. The axial retaining arrangement is disposed between the adapter and the mounting opening to prevent axial removal of the adapter from the mounting opening. The holding member is attached to the bicycle fork. The holding member and the adapter are configured and arranged such that the holding member prevents rotation of the adapter when the adapter is mounted in the axle mounting opening of the bicycle fork and engaged with the holding member.

14 Claims, 10 Drawing Sheets

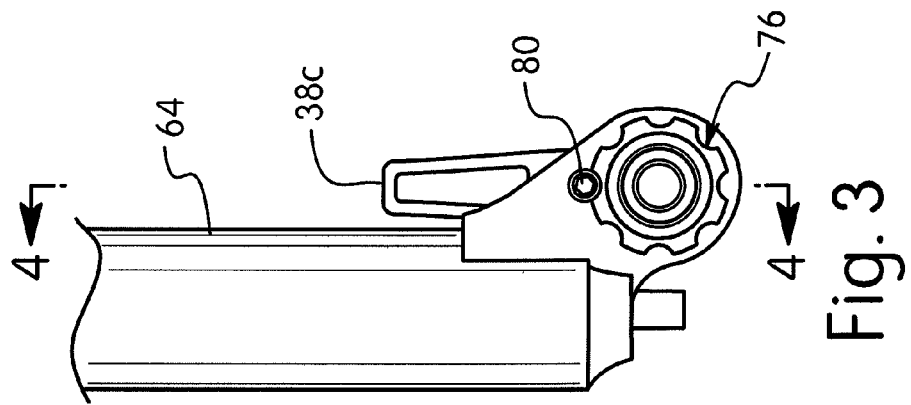
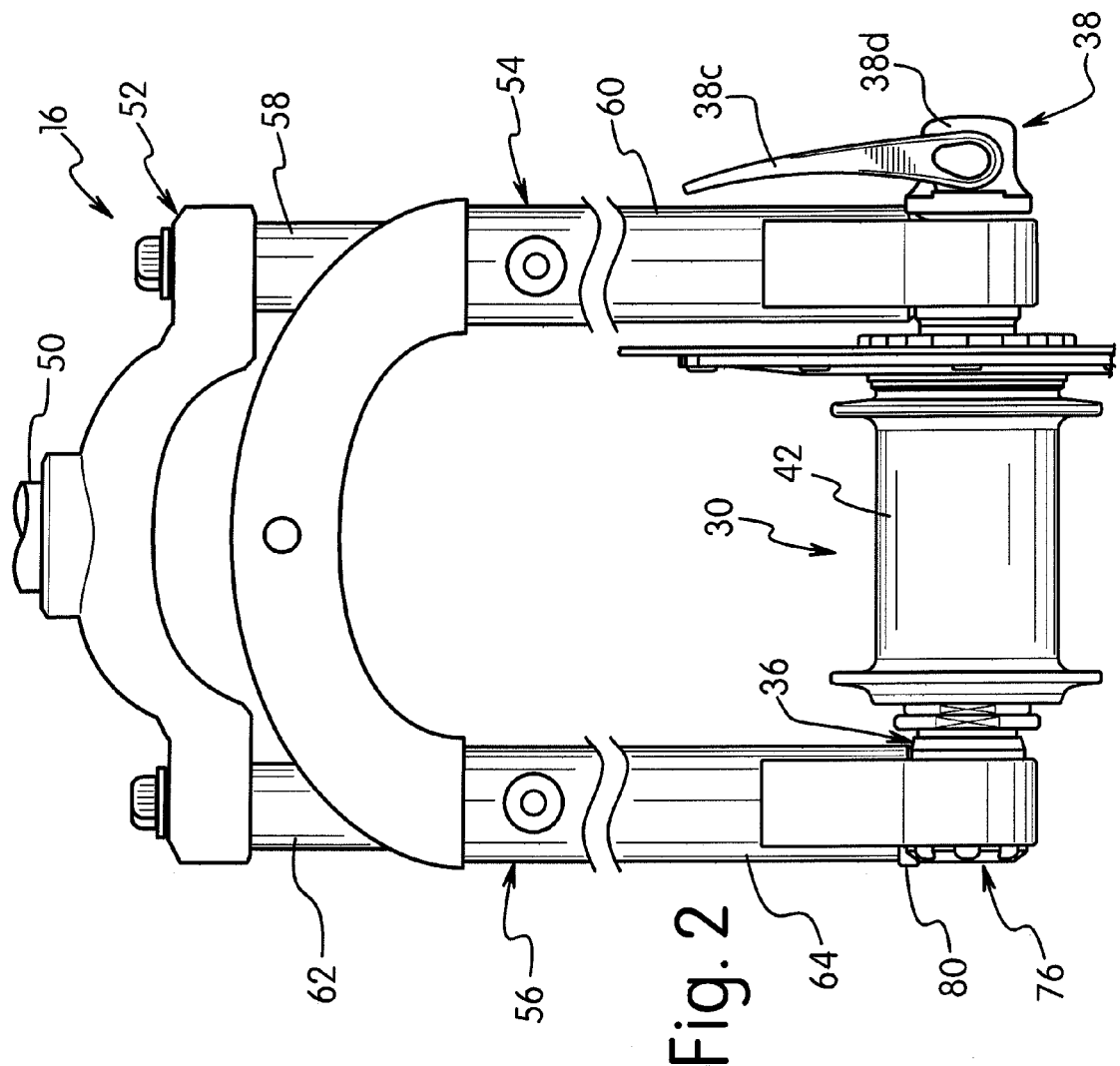

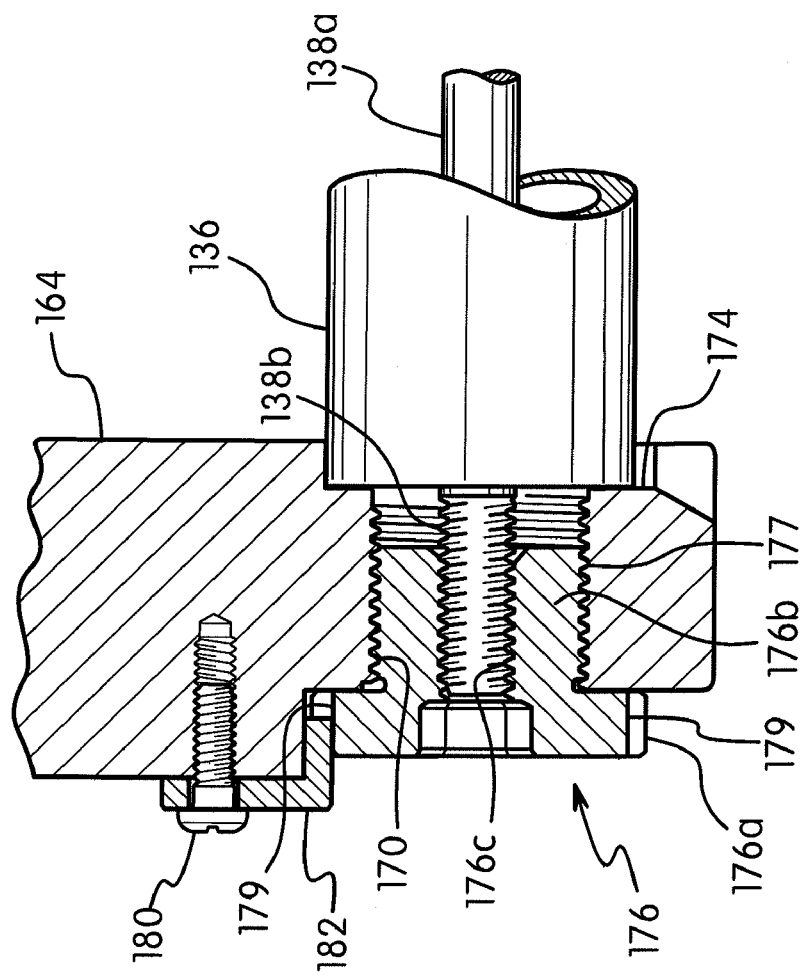
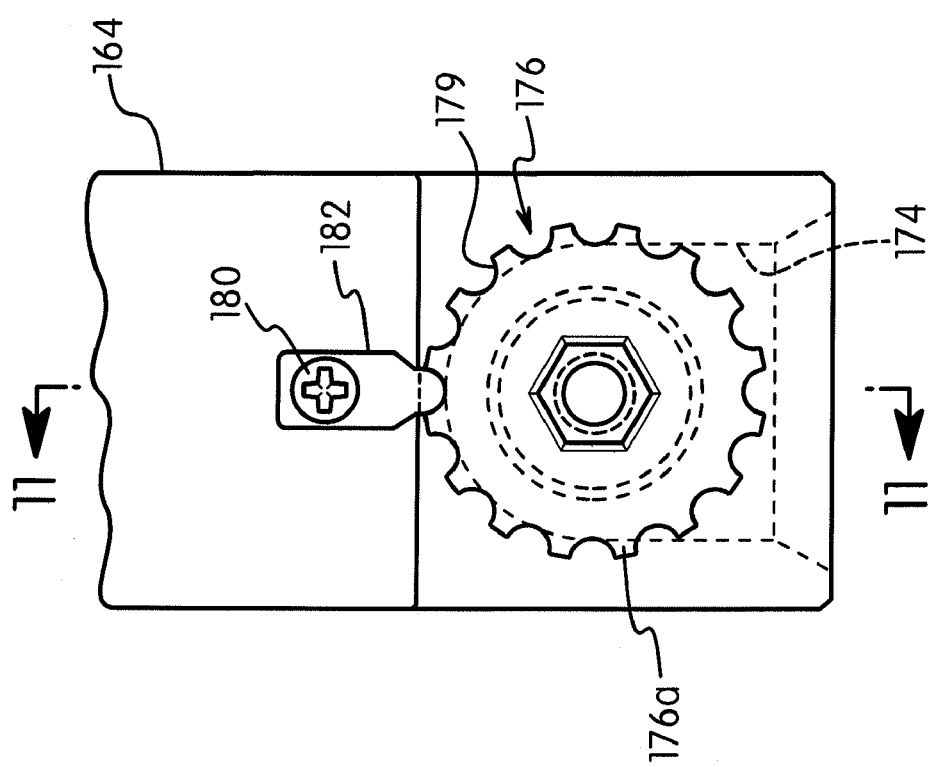
Fig. 11
Fig. 10

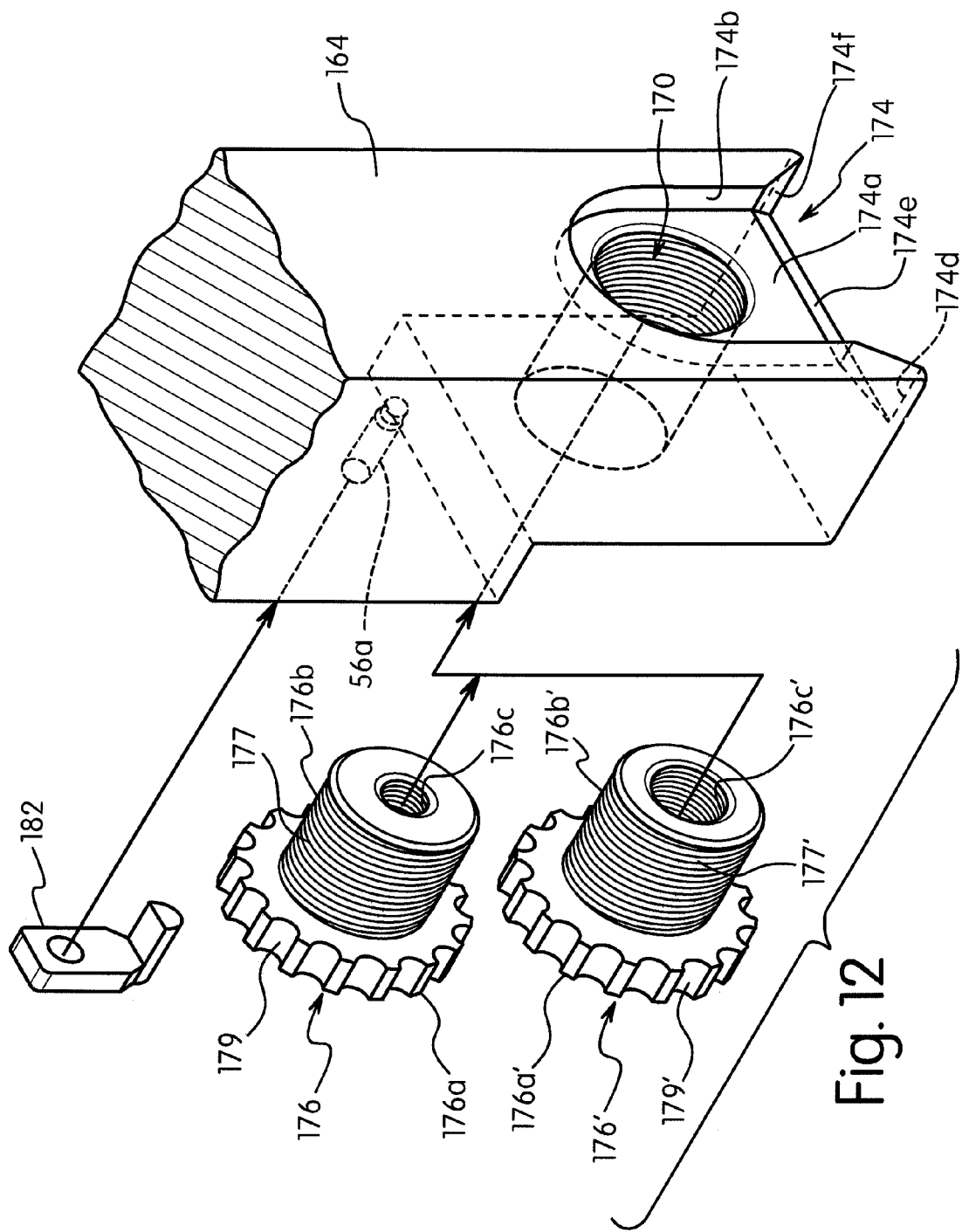

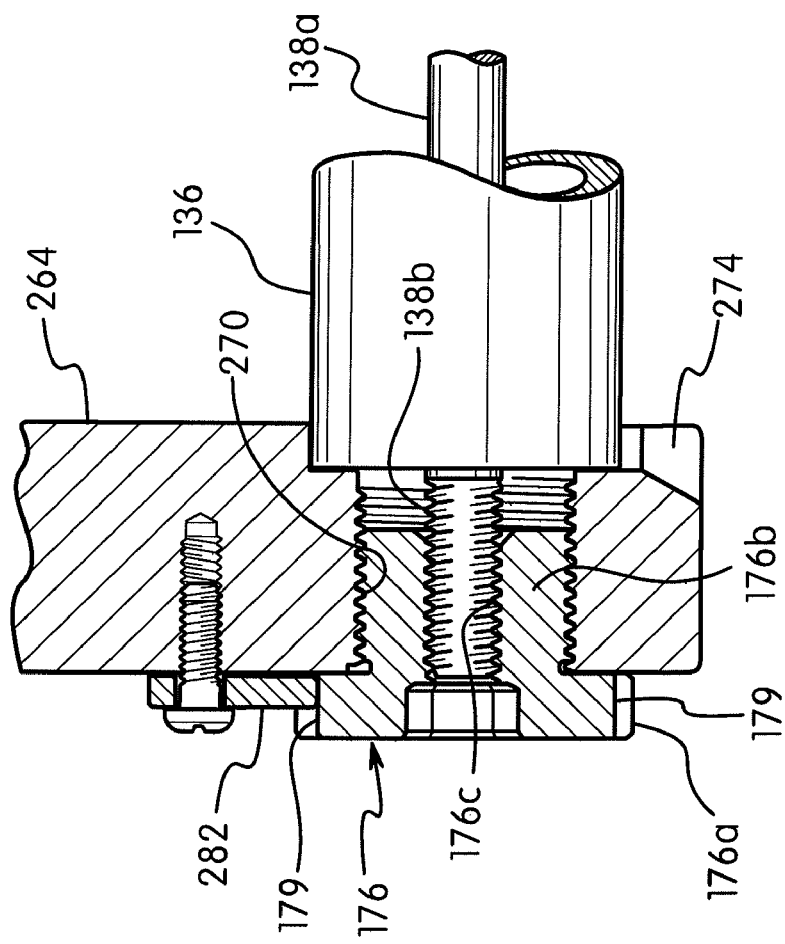
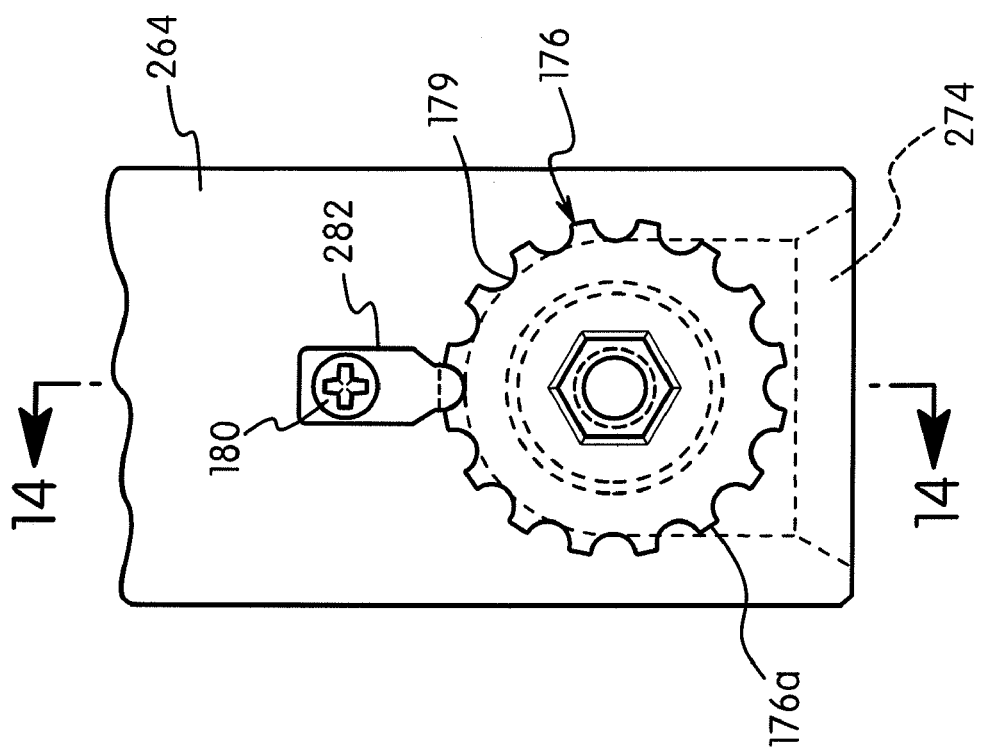
Fig. 14
Fig. 13

BICYCLE WHEEL SECURING STRUCTURE

CROSS-REFERENCE TO RELATED APPLICATIONS

This application is a continuation-in-part (CIP) application of U.S. patent application Ser. No. 11/676,052 filed on Feb. 16, 2007 (pending). The entire disclosure of U.S. patent application Ser. No. 11/676,052 is hereby incorporated herein by reference.

BACKGROUND OF THE INVENTION

1. Field of the Invention

This invention generally relates to a connection between a bicycle fork and a wheel securing axle of a bicycle hub. More specifically, the present invention relates to a bicycle wheel securing structure used to attach the wheel securing axle of the bicycle hub to the bicycle fork.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

A bicycle is generally provided with a frame and a front fork that is connected in a freely rotatable manner to a front end portion of the frame. The front fork basically includes a fork stem, a fork crown and a pair of fork legs. The two fork legs are arranged on opposite sides of the front wheel with the tip end portions of the fork legs being connected to a front hub arranged on the rotational center of the front wheel. The fork crown is connected to the upper end portions (i.e., opposite ends from the tip end portions) of the fork legs. The fork stem is connected to the fork crown, and is arranged to extend upwardly form the fork crown. The fork stem is supported on the front end portion of the frame in a freely rotatable manner. In some cases, the front fork is a suspension fork with each of the fork legs including an upper or inner tube and a lower or outer tube that is telescopically arranged with the upper tube. The rear part of the frame has a similar rear fork that is not pivotal like the front fork. The rear fork can be fixed to the frame (i.e. a hard tail type) to form the rear triangle of the frame or can be a suspension type rear fork attached to the frame.

Typically, the lower tip ends of the forks are provided with dropouts (open ended slots) for attaching the wheels. In the past, the ends of the hub axles were inserted into the dropouts (open ended slots) and then fastened with nuts. However, since bicycle wheels often need to be removed from the frame, e.g., whenever there is a flat tire or a need to transport the bicycle in an automobile, wheel securing mechanisms were developed in order to facilitate easier removal and reinstallation of the wheels. A typical wheel securing device includes a skewer with a threaded end having a wheel securing member mounted at the other end. The wheel securing member includes a base with a lever and a cam structure. A nut is detachably threaded onto the threaded end of the skewer after the skewer is inserted through the hub body. The fork flanges are arranged between the base of the wheel securing member and the hub body and between the nut and the hub body, respectively. Thus, the hub can be attached by clamping the fork flanges using the wheel securing lever. While these typical wheel securing mechanisms generally work well, a tighter connection between the hub and the frame has been in demand for some riders.

Thus, bicycle hubs and bicycle forks have been designed such that an axle of the hub is threadedly attached directly to the bicycle fork. An example of this type of arrangement on a front hub and front fork is disclosed in U.S. Pat. No. 6,089,675. With this type of arrangement, a knob is provided on the end of the hub axle opposite the threaded end. The knob is used to rotate the axle during installation to both tighten the axle to the front fork and to clamp one fork flange between the knob and the hub. With this type of hub, a tighter connection between the hub and the front fork is possible as compared to typical wheel securing hubs. However, because of this tighter connection, it is necessary to make the front fork stronger.

In view of the above conventional technology, it will be apparent to those skilled in the art from this disclosure that there exists a need for an improved connection between a fork and a wheel securing axle of a hub. This invention addresses this need in the art as well as other needs, which will become apparent to those skilled in the art from this disclosure.

SUMMARY OF THE INVENTION

One object of the present invention is to provide a bicycle wheel securing structure, which utilizes a removable adapter that is overridably prevented from being removed from a bicycle fork once attached thereto.

Another object of the present invention is to provide a bicycle wheel securing structure, which can provide a strong connection between a bicycle fork and a wheel securing axle of a bicycle hub.

Another object of the present invention is to provide a bicycle wheel securing structure, which utilizes a removable adapter that can be replaced with a different adapter in order to attach a hub with a different configuration to the fork.

Yet another object of the present invention is to provide a bicycle wheel securing structure, which utilizes a holding member configured and arranged to prevent rotation of the adapter for easy attachment to and release from a wheel securing axle of a hub.

The foregoing objects can basically be attained by providing a bicycle wheel securing structure, which comprises an adapter, an axial retaining arrangement and a holding member. The adapter includes a first portion, a second portion and an axial bore. The first portion has a first maximum width. The second portion extends axially from the first portion. The second portion has a second maximum width that is smaller than the first maximum width of the first portion to form an axially facing abutment surface between the first and second portions. The second portion is configured and arranged to be mounted in an axle mounting opening of a bicycle fork. The axial bore extending from a second end face of the second portion is at least partially threaded. The axial retaining arrangement is disposed between the second portion of the adapter and the mounting opening to prevent axial removal of the adapter from the mounting opening. The holding member is attached to the bicycle fork. The holding member and the adapter are configured and arranged such that the holding member prevents rotation of the adapter when the adapter is mounted in the axle mounting opening of the bicycle fork and engaged with the holding member.

These and other objects, features, aspects and advantages of the present invention will become apparent to those skilled in the art from the following detailed description, which, taken in conjunction with the annexed drawings, discloses preferred embodiment of the present invention.

BRIEF DESCRIPTION OF THE DRAWINGS

Referring now to the attached drawings which form a part of this original disclosure:

FIG. 2 is an enlarged, partial front elevational view of the front fork, front hub and wheel securing structure illustrated in FIG. 1;

FIG. 3 is a side elevational view of the front hub, front fork and wheel securing structure illustrated in FIG. 2;

FIG. 10 is a side elevational view of a front hub, a front fork and a bicycle wheel securing structure in accordance with a second embodiment of the present invention;

FIG. 11 is a partial, longitudinal cross sectional view of the front hub, front fork and wheel securing structure illustrated in FIG. 10, as seen along section line 11-11 of FIG. 10;

FIG. 12 is an exploded, partial perspective view of one of the fork legs and the wheel securing structure illustrated in FIGS. 10 and 11, but with two different wheel securing adapters shown in accordance with the second embodiment of the present invention;

FIG. 13 is a side elevational view of a front hub, a front fork and a bicycle wheel securing structure in accordance with a third embodiment of the present invention; and FIG. 14 is a cross sectional view of a front hub, a front fork and a bicycle wheel securing structure illustrated in FIG. 13, as seen along section line 14-14 of FIG. 13.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
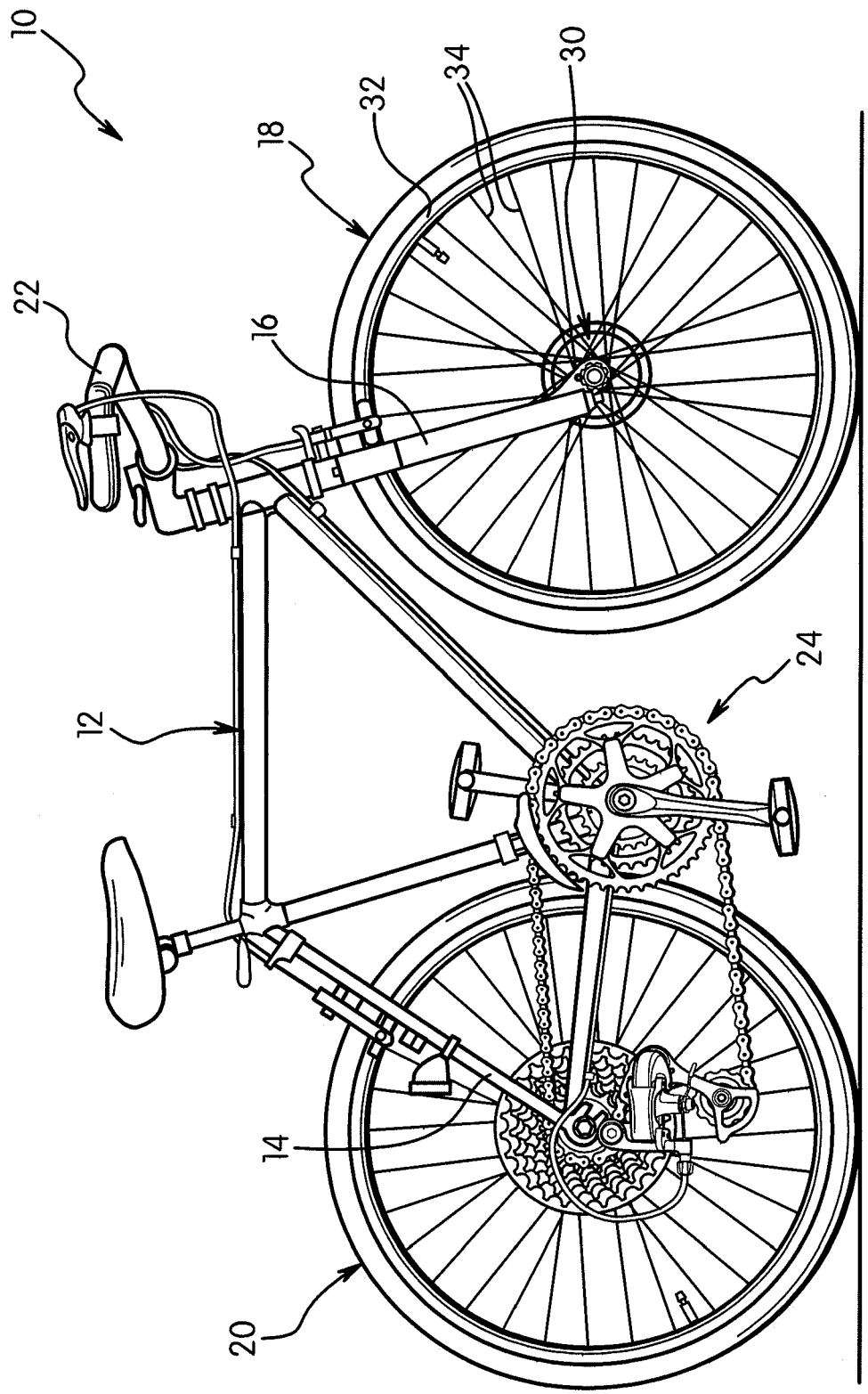
FIG. 1 is a side elevational view of a bicycle with a front fork having a front hub attached to the front fork using a bicycle wheel securing structure in accordance with a first embodiment of the present invention.

Referring initially to FIGS. 1 and 2, a bicycle 10 is illustrated in accordance with the present invention. The bicycle 10 basically includes, among other things, a main frame 12 with a rear triangle 14, a front suspension fork 16, a front wheel 18, a rear wheel 20, a handle bar 22 and a drive train 24. The front wheel 18 is attached the front fork 16 in accordance with a first embodiment of the present invention, as explained below. Otherwise, the bicycle 10 and its various components are conventional.

Thus, the rear wheel 20 is attached to the rear triangle 14 in a conventional manner. The handle bar 22 is fastened to the front suspension fork 16 (hereinafter "the front fork 16") to steer the bicycle 10 in a conventional manner. The drive train 24 is attached to the bicycle 10 to propel the bicycle in a conventional manner. The drive train 24 is a conventional drive train that basically includes a chain, a front crankset, a rear cassette sprocket set, a pair of pedals, a pair of derailleurs, etc. Since the bicycle 10 and its various components are conventional, the bicycle 10 and its various components will not be discussed and/or illustrated in detail herein, except as related to the present invention. Moreover, it will be apparent to those skilled in the bicycle art from this disclosure that various modifications can be made to the bicycle 10 and its components without departing from the present invention. For example, the rear triangle 14 can be connected to the rear wheel 20 in the same manner as the connection between the front fork 16 and the front wheel 18. Also the present invention can be applied to a non-suspension front fork and/or to a rear suspension type bicycle frame.

Referring still to FIGS. 1 and 2, the front wheel 18 basically includes a front hub 30, a rim 32 and a plurality of tension spokes 34 extending between the front hub 30 and the rim 32. A tire is mounted on the rim 32 in a conventional manner. The structure of the front wheel 18 is not critical to the present invention, and thus, will not be discussed and/or illustrated in detail herein, except as necessary to understand the present invention. Specifically, only the front hub 30 will be briefly discussed to understand the connection of the front hub 30 to the front fork 16 in accordance with the present invention.

Figure 4:
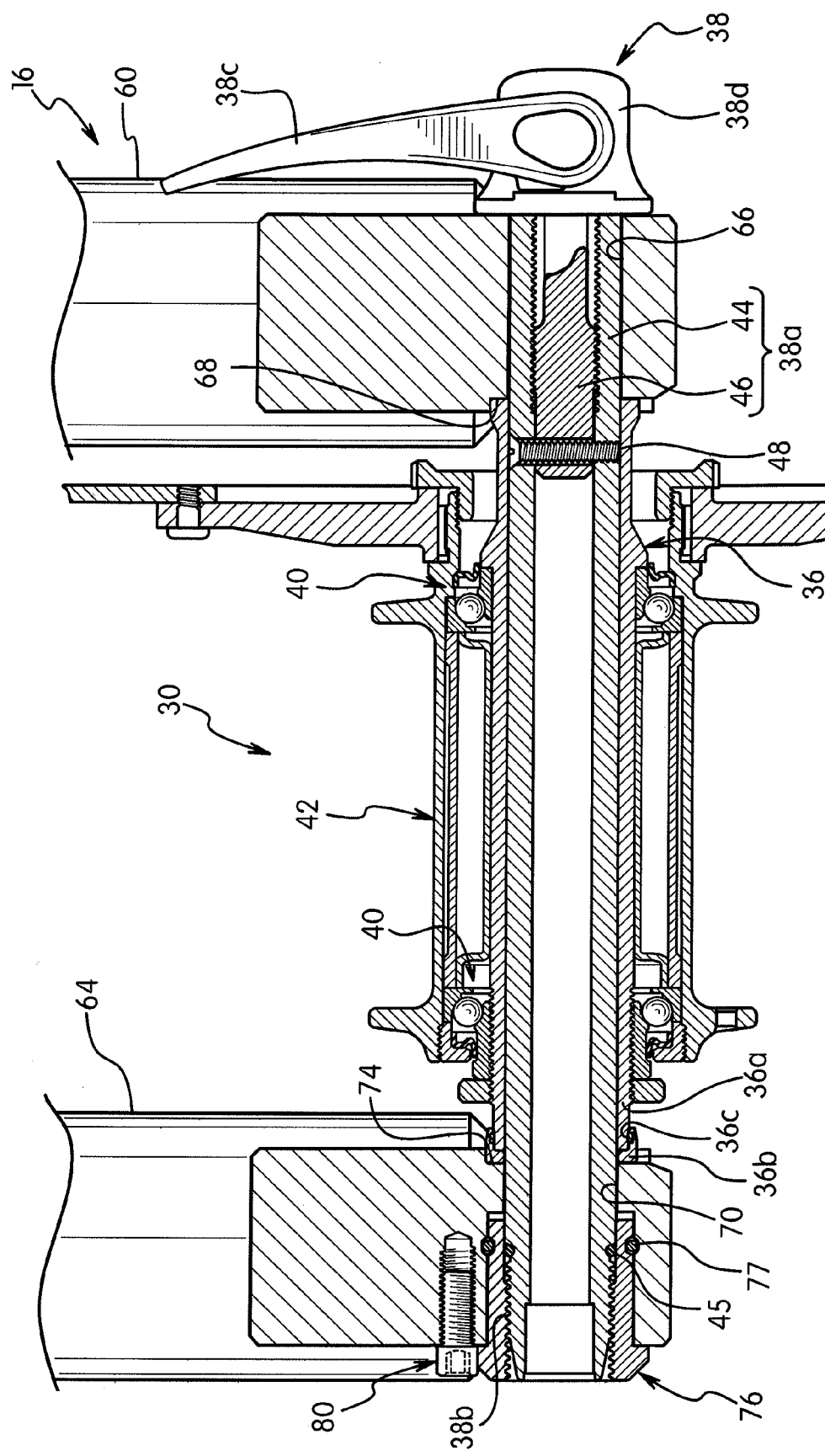
FIG. 4 is a slightly enlarged, partial longitudinal cross sectional view of the front hub, front fork and wheel securing structure illustrated in FIGS. 2 and 3, as seen along section line 4-4 of FIG. 3.
Figure 5:
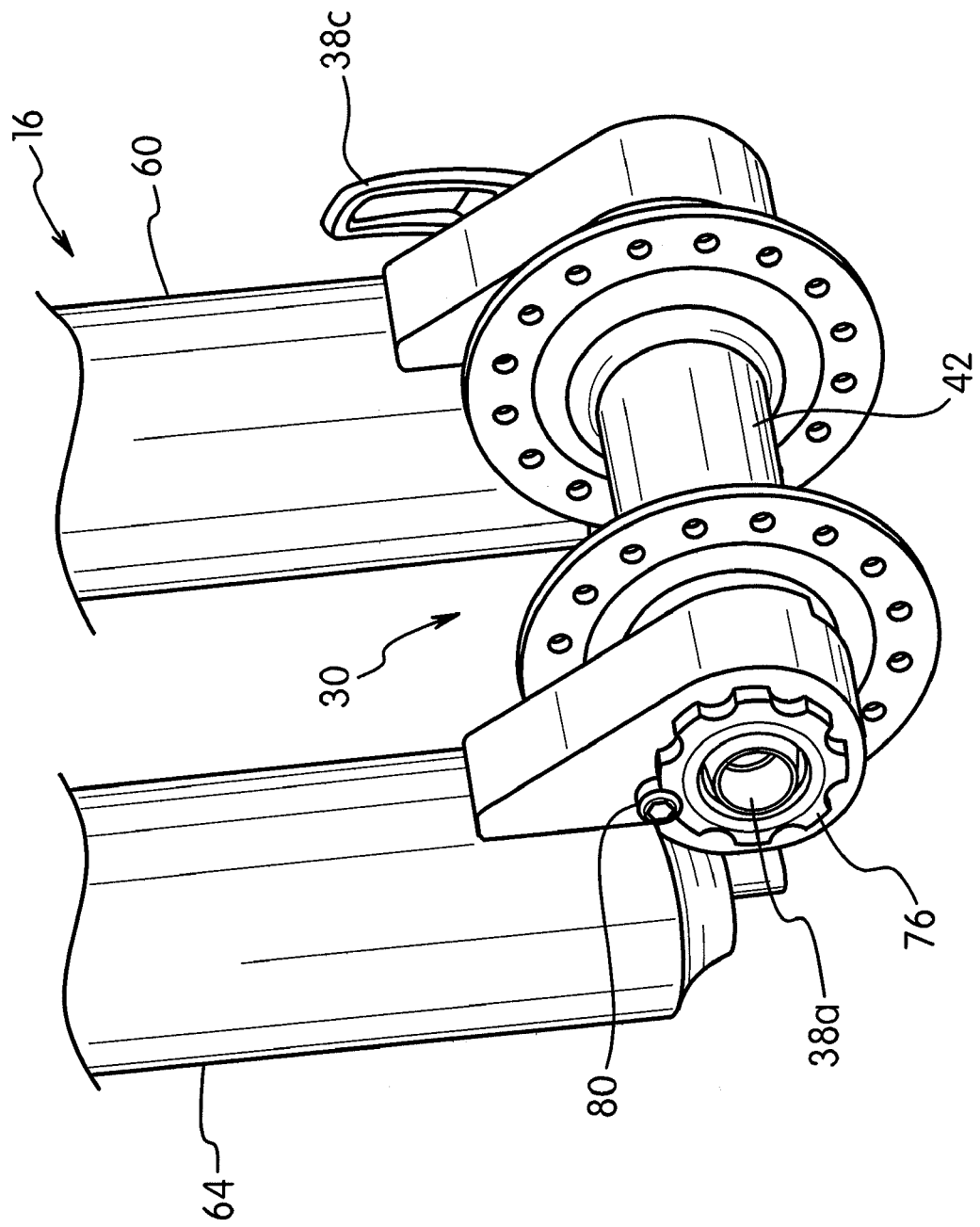
FIG. 5 is an enlarged front perspective view of the front hub, front fork and wheel securing structure illustrated in FIGS. 2 and 3.

Referring now to FIGS. 2-4, the front hub 30 basically includes a tubular hub axle 36, a wheel securing axle 38, a pair of bearing units 40 and a hub shell 42. The hub shell 42 is rotatably supported on the tubular hub axle 36 via the bearing units 40. The wheel securing axle 38 extends through the tubular hub axle 36 and fixes the tubular hub axle 36 to the front fork 16 so that the hub shell 42 can rotate about the tubular hub axle 36 on the bearing units 40. In particular, the wheel securing axle 38 has a skewer or shaft 38a that extends through the tubular hub axle 36. One end of the skewer 38a has external threads 38b, while the other end of the skewer 38a has a cam lever 38c pivotally mounted thereto by a steel cam (not shown) and a cam cap 38d that surrounds the cam of the cam lever 38c. The cam cap 38d is the part of the wheel securing axle 38 that moves axially back and forth relative to the skewer 38a when the cam lever 38c is moved between a release or open position (not shown) and a clamping or closed position in a conventional manner.

Referring to FIGS. 2-4, 8 and 9, the tubular hub axle 36 includes a stepped (externally) tubular part 36a, a washer part 36b and a retaining ring part 36c. The stepped tubular part 36a is an elongated element that has the washer part 36b retained on an end thereof using the retaining ring part 36c. Specifically, the retaining ring part 36c is mounted in an internal annular groove of the washer part 36b, and the stepped tubular part 36a has a shallow annular groove that engages the retaining ring part 36c when the washer part 36b is slid onto the end of the stepped tubular part 36a. The stepped tubular part 36a and the washer part 36b are each preferably constructed as a one-piece, unitary member from a lightweight, rigid, metallic material. On the other hand, the retaining ring part 36c is preferably constructed as a one-piece, unitary member from a lightweight, rigid, synthetic resin material. Due to the above construction, the stepped tubular part 36a and the washer part 36b are configured and arranged such that the washer part 36b is overrideably retained on the end of the stepped tubular part 36a, once the front hub 30 is fully assembled. Thus, undesirable axial displacement of the washer part 36b can be prevented.

The washer part 36b has a larger axially facing contact area than the free end of the stepped tubular part 36a on which the washer part 36b is mounted. The opposite end of the stepped tubular part 36a has an axially facing contact surface the same size as the corresponding surface of the washer part 36b so as to have the same size contact area. This configuration allows the stepped tubular part 36a to be inserted axially through other parts of the front hub 30 from the right side as shown in FIG. 4, yet to have an inserted end with a contact area as large as the free end of the stepped tubular part 36a once the washer part 36b is attached to the stepped tubular part 36a. The enlarged contact areas on the stepped tubular part 36a and the washer part 36b contribute to reduced axial contact pressure between the front fork 16 and the tubular hub axle 36. Thus, the chance of potential damage to the front fork 16 can be effectively reduced even if the front hub 30 is very tightly secured to the front fork 16, even after extended use. Moreover, the enlarged contact areas on the stepped tubular part 36a and the washer part 36b contribute to a very rigid, strong holding/supporting connection between the front hub 30 and the front fork 16. The front fork 16 has recesses that cooperate with the ends of the tubular hub axle 36, as explained below.

Figure 6:
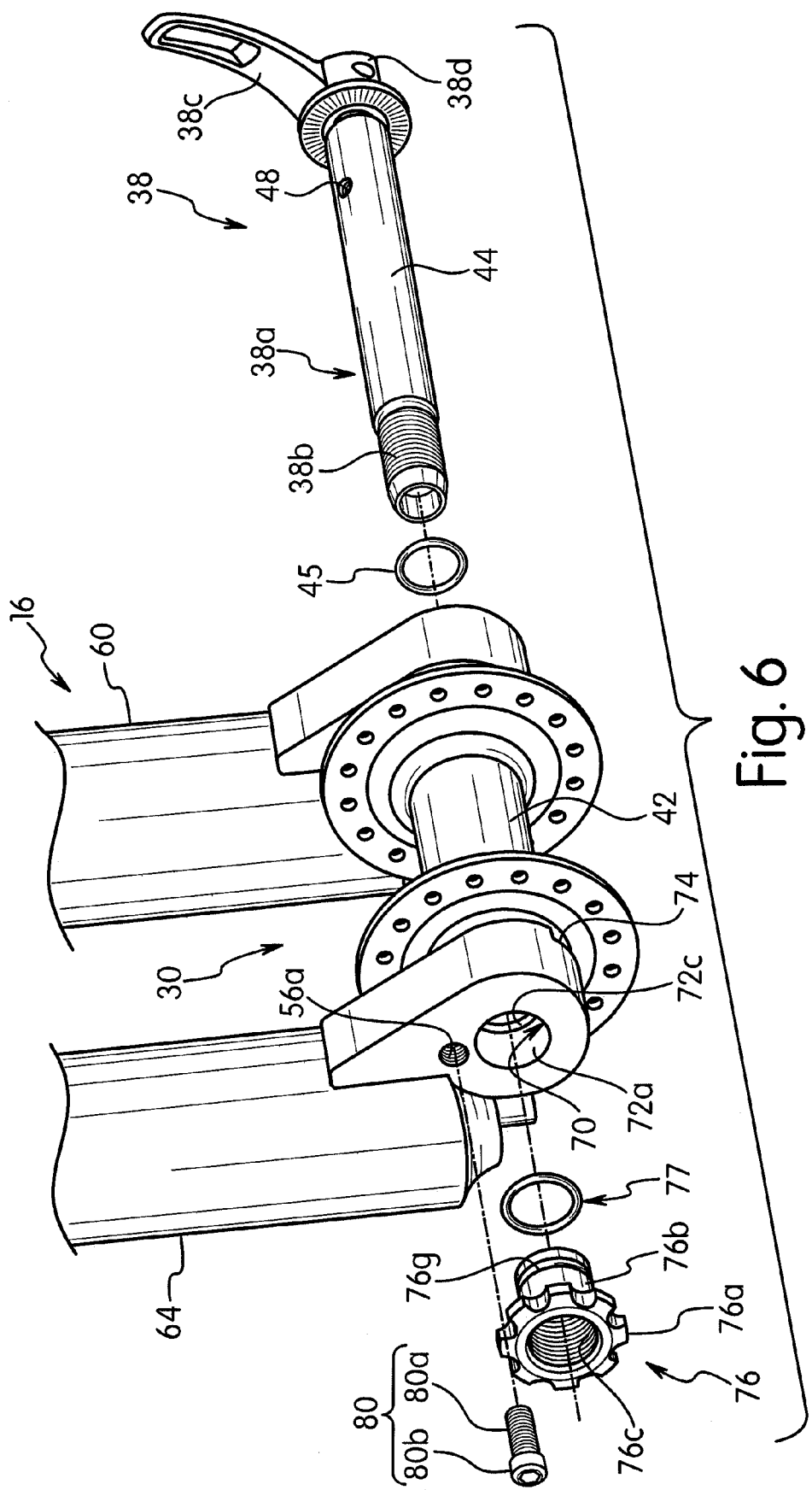
FIG. 6 is a partially exploded front perspective view of the front hub, front fork and wheel securing structure illustrated in FIG. 4.

Referring to FIGS. 2, 4 and 6, in the illustrated embodiment, the skewer 38a is a two-part member having an outer shaft 44 and an inner shaft 46 threadedly attached within an internal bore of the outer shaft 44. In this embodiment, the cam lever 38c and the cam cap 38d are attached to a free end of the inner shaft 46 that extends out of the internal bore of the outer shaft 44. A retaining member such as a bolt (shown) 48 or a press pin (not shown) extends transversely through holes formed in the outer shaft 44 and the inner shaft 46 to prevent rotational movement of the inner shaft 46 relative to the outer shaft 44 when the retaining member 48 is disposed in the transverse holes, as best understood from FIG. 4. Since the outer and inner shafts 44 and 46 are threadedly coupled together, axial movement of the inner shaft 46 relative to the outer shaft 44 is prevented when relative rotation is prevented. Of course, it will be apparent to those skilled in the bicycle art from this disclosure that the skewer 38a illustrated herein is merely one example of many possible structures that could be utilized as needed and/or desired. The outer shaft 44 preferably has an O-ring 45 mounted in an annular groove adjacent the external threads 38b.

When swinging the cam lever 38c from full open (not shown), to full closed, one should just start to feel some resistance when the cam lever 38c is pointing straight out (sideways or perpendicular) from the wheel 18. This resistance should start getting harder at about two-thirds the way closed, and really hard up to the three-quarter point closed (still one-quarter open). Then, turning of the cam lever 38c typically get easier the rest of the way. Thus, the cam lever 38c moves "over the top" of its cam. However, some wheel securing axles just get progressively tighter without any perceptible feel of "going over the top".

Referring again to FIGS. 1-4, the front fork 16 is rotatably mounted to a head tube in a front part of the main frame 12, and is used to steer the front wheel 18. As seen in FIG. 2, the front fork 16 basically includes a fork stem or steerer tube 50, a fork crown 52 and a pair of fork legs 54 and 56. The fork legs 54 and 56 are arranged on opposite sides of the front wheel 18 with the tip end portions of the fork legs 54 and 56 being connected to the front hub 30 that is arranged on the rotational center of the front wheel 18. In the illustrated embodiment, the front fork 16 is a suspension fork in which the fork leg 54 includes an upper or inner tube 58 and a lower or outer tube 60 that is telescopically arranged with the upper tube 58, while the fork leg 56 includes an upper or inner tube 62 and a lower or outer tube 64 that is telescopically arranged with the upper tube 62. The fork crown 52 is connected to the upper ends of the upper tubes 58 and 62 (i.e., opposite ends from the tip end of the lower tubes 60 and 64) of the fork legs 54 and 56. The fork stem 50 is connected to the fork crown 52, and is arranged to extend upwardly form the fork crown 52. The fork stem 50 is supported on the front end portion of the main frame 12 in a freely rotatable manner.

The lower end of the outer tube 60 of the (first) fork leg 54 includes a first axle mounting opening or bore 66 and a cutout 68 that receives one end of the tubular hub axle 36. Specifically, the cutout 68 partially receives the free end of the stepped tubular part 36a. The first axle mounting opening 66 receives the skewer 38a therethrough. Specifically, the axle mounting opening 66 is sized to slidably receive the outer shaft 44. The lower end of the outer tube 64 of the (second) fork leg 56 includes a second axle mounting opening or bore 70 and a cutout 74 that receives one end of the tubular hub axle 36. Specifically, the cutout 74 partially receives the washer part 36b of the tubular hub axle 36.

The axle mounting bore 72 has a step-shaped configuration with an enlarged section 72a and a reduced section 72b, each of which are unthreaded. The enlarged section 72a of the axle mounting bore 70 is configured and arranged to receive a wheel securing adapter 76 in a releasable and reinstallable manner. Moreover, the enlarged section 72a of the axle mounting bore 70 is configured and arranged to normally prevent axial removal of the wheel securing adapter 76 when the wheel securing adapter 76 is mounted in the enlarged section 72a.

Specifically, the enlarged section 72a of the axle mounting bore 70 has an annular groove 72c formed therein that is configured and arranged to overrideably, releasably and reinstallably engage a part of the wheel securing adapter 76, as explained below in more detail. In other words, the wheel securing adapter 76 can be installed, removed and reinstalled without damaging the lower end of the outer tube 64 of the fork leg 56, and the wheel securing adapter 76 can be axially retained in the axle mounting opening 70 even when the wheel securing adapter 76 is not attached to the skewer 38a. The reduced section 72b receives the skewer 38a therethrough, and is sized to support the skewer 38a. In the illustrated embodiment, the axle mounting bore 70 has a circular shape as viewed along the center axis thereof.

Referring now to FIGS. 2-9, the wheel securing adapter 76 will now be explained in more detail. The wheel securing adapter 76 is preferably a one-piece, unitary member that is formed of a hard rigid material. Preferably, the material of the wheel securing adapter 76 is harder than the material of the outer tube 64 of the fork leg 56. Thus, if the wheel securing adapter 76 becomes damaged, the wheel securing adapter 76 can be replaced without replacing the front fork 16, which is sometimes necessary with prior art connections.

The wheel securing adapter 76 includes a first adapter portion 76a and a second adapter portion 76b with an internal bore 76c extending completely through both the first and second adapter portions 76a and 76b. Thus, the first and second adapter portions 76a and 76b are arranged to form a first end face with a first opening on the first adapter portion 76a and a second end face with a second opening on the second adapter portion 76b with the internal bore 76c extending axially from the first end face into the first adapter portion 76a to the second end face into the second adapter portion 76b. Alternatively, the internal bore 76c could be a blind bore that extends from the second end face on the second adapter portion 76b, and the skewer 38a could be axially shorter than illustrated herein.

The internal bore 76c includes an unthreaded section 76d disposed adjacent the second end face of the second adapter portion 76b and a threaded section 76e axially spaced from the second end face of the second adapter portion 76b. Thus, the unthreaded section 76d is axially disposed between the threaded section 76e and the second end face of the second adapter portion 76b. The threaded section 76e threadedly engages the external threads 38b of the end of the skewer 38a of the wheel securing axle 38 to secure the tubular hub axle 36 of the front hub 30 to the outer tube 64 of the fork leg 56. The O-ring 45 mounted on the outer shaft 44 engages the unthreaded section 76d to prevent undesirable rotation of the skewer 38 relative to the wheel securing adapter 76.

In this embodiment, the second adapter portion 76b is received in the axle mounting opening 70, while the first adapter portion 76a abuts against the lower end of the outer tube 64 of the (second) fork leg 56. The second adapter portion 76b has an external surface 76f that is unthreaded along the entire axial length of the second adapter portion 76b. An annular groove 76g is formed in the external surface 76f. An O-ring 77 is disposed in the annular groove 76g so that the O-ring 77 normally projects at least partially radially outwardly from the unthreaded external surface 76f to contact an internal surface of the axle mounting opening 70 (i.e., the enlarged section 72a or the annular groove 72c depending on the axial position of the wheel securing adapter 76).

Figure 8:
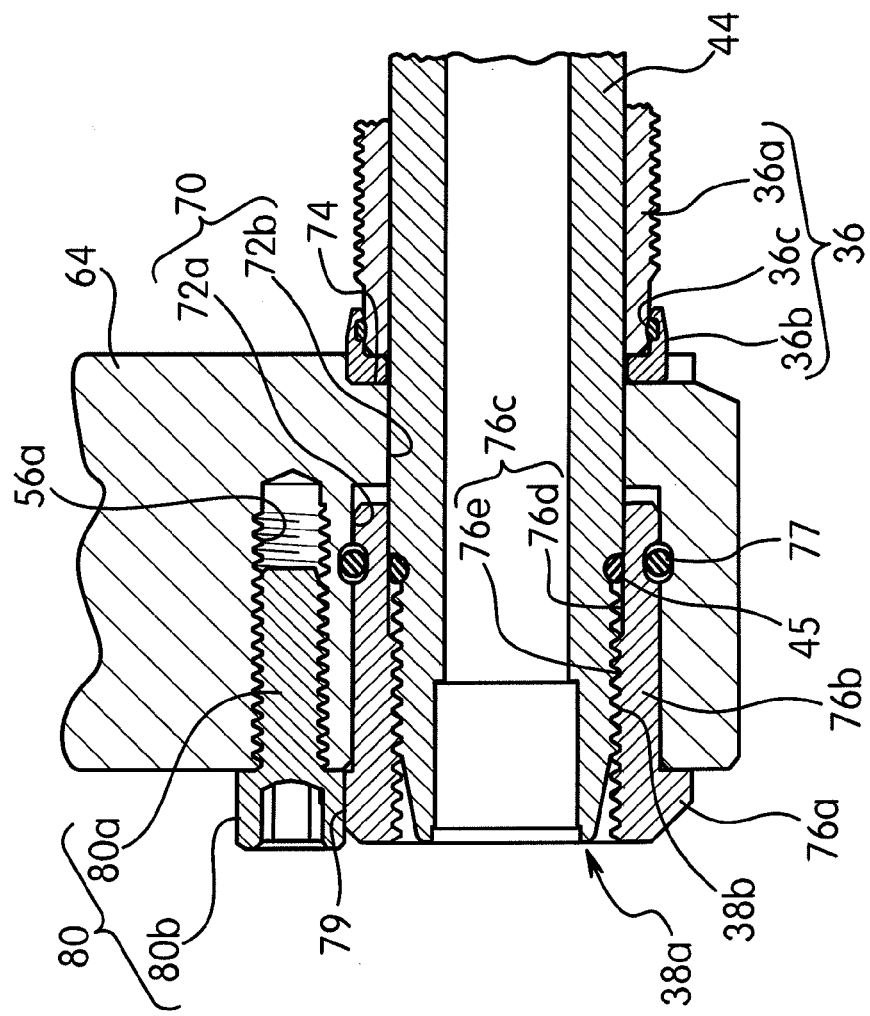
FIG. 8 is a partial, longitudinal cross sectional view of the front hub, front fork and wheel securing structure illustrated in FIG. 7, as seen along section line 8-8 of FIG. 7.
Figure 7:
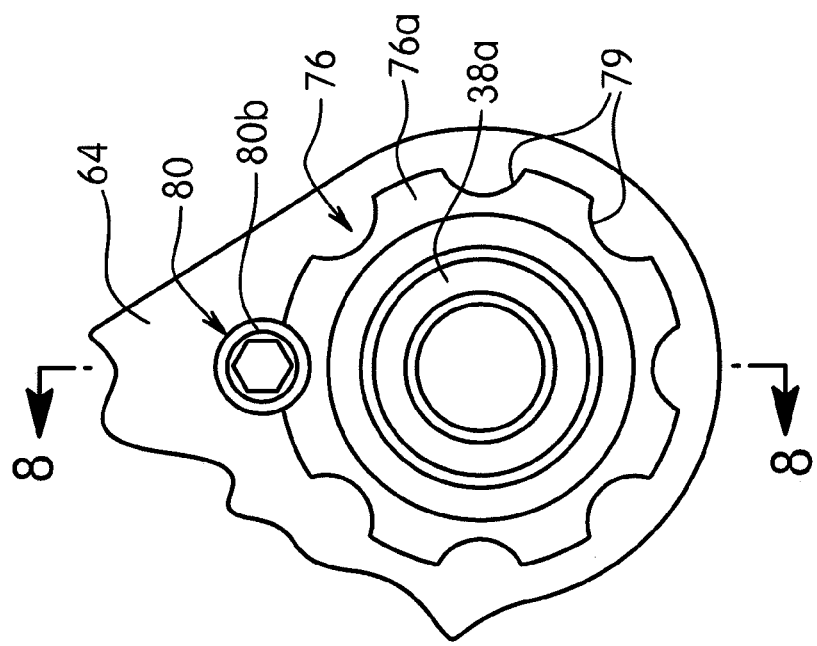
FIG. 7 is an enlarged side elevational view of the front hub, front fork and wheel securing structure illustrated in FIGS. 2-6.
Figure 9:
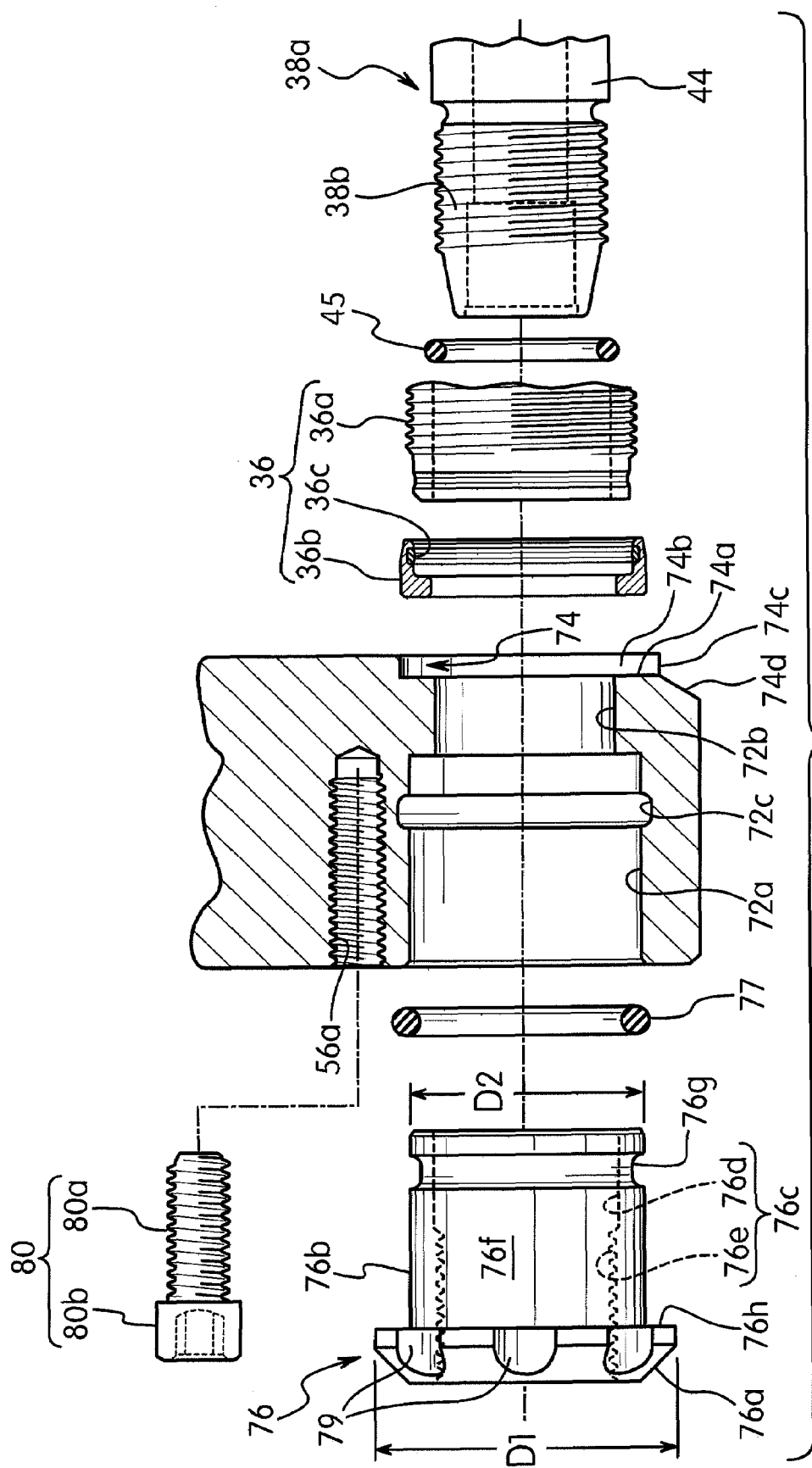
FIG. 9 is an exploded, partial longitudinal cross sectional view of the front hub, front fork and wheel securing structure illustrated in FIG. 7, as seen along section line 8-8 of FIG. 7.

The annular groove 76g is axially wider than the maximum cross-sectional diameter of the O-ring 77, but radially shallower than the maximum diameter of the O-ring 77, as best seen in FIG. 9. The annular groove 72c has a similar configuration as shown in FIGS. 8 and 9. Thus, the O-ring 77 can be compressed into the annular groove 76g during insertion of the second adapter portion 72b into the enlarged section 72a of the axle mounting hole 70, as best understood from FIGS. 8 and 9. However, the O-ring 77 engages the annular groove 72c formed in the enlarged section 72a once axially aligned therewith. Specifically, each of the O-rings 45 and 77 is preferably constructed of an elastomeric material such as rubber so that the O-rings 45 and 77 can be elastically deformed. Thus, even though the elastically deformed shape of the O-ring 77 is not illustrated herein, it will be understood by those of ordinary skill in the bicycle art.

Due to the above arrangement, the O-ring 77, the external surface of the wheel securing adapter 76 and the axle mounting bore 70 are configured and arranged to cooperate with each other to prevent relative axial movement of the wheel securing adapter 76 within the axle mounting bore 70, especially in the fully installed position shown in FIGS. 4 and 8. Accordingly, the O-ring 77, the external surface 76f of the wheel securing adapter 76 having the annular groove 76g and the enlarged section 72a of the axle mounting bore 70 constitute parts of an axial retaining arrangement disposed between the second adapter portion 76b of the wheel securing adapter 76 and the axle mounting opening 70 to overrideably, releasably and reinstallably prevent axial removal of the wheel securing adapter 76 from the axle mounting opening 70.

Referring to FIGS. 3-9, preferably, the lower end of the outer tube 64 of the fork leg 56 has a threaded hole 56a for threadedly receiving a bolt 80. The bolt 80 includes a threaded shaft 80a and an enlarged head 80b with a hexagonal bore formed therein. The threaded shaft 80a is threadedly received in the threaded hole 56a, and tightened such that the enlarged head 80b abuts against the lower end of the outer tube 64. When the bolt 80 is fully installed and the wheel securing adapter 76 is fully installed, the enlarged head 80b engages the first adapter portion 76a of the wheel securing adapter 76 to prevent relative rotation of the wheel securing adapter 76.

Preferably, the wheel securing adapter 76 is installed in the axle mounting opening 70 prior to attaching the bolt 80 so that the wheel securing adapter 76 can be rotated if needed to more easily install the wheel securing adapter 76. Once the wheel securing adapter 76 is fully installed, the bolt 80 is can be installed to prevent rotation of the wheel securing adapter 76. The wheel securing axle 38 can be threadedly attached to the wheel securing adapter 76 after the bolt 80 is installed or before the bolt 80 is installed. Specifically, if the starting thread position of the wheel securing adapter 76 needs to be adjusted (i.e., to adjust the final position of the cam lever 38c), the bolt 80 should be installed after the wheel securing axle 38 so that the desired final rotational position of the wheel securing adapter 76 can be adjusted during attachment of the wheel securing axle 38 prior to installing the bolt 80. If the thread starting position of the wheel securing adapter needs to be adjusted again later, the bolt 80 should again be removed so that the wheel securing adapter 76 can be rotated. Also, if the wheel securing adapter 76 needs to be removed (e.g. to be replaced with a new identical wheel securing adapter 76 or a different type of wheel securing adapter), the bolt 80 is preferably removed so that the wheel securing adapter 76 can be rotated if needed to more easily remove/uninstall the wheel securing adapter 76 from the axle mounting opening 70.

In other words, it will be apparent to those skilled in the bicycle art from this disclosure that the wheel securing adapter 76 can be replaced with a modified wheel securing adapter for use with a modified wheel securing axle. For example, a different type of hub may be provided, which has a modified wheel securing axle a different sized threaded skewer. In such a case, a modified version of the wheel securing adapter 76 can be provided, which has an internal bore having a size corresponding to the modified wheel securing axle (e.g., the bore 76c can be modified to be sized like the bores 176c and 176c' of the wheel securing adapters 176 and 176' in the later described embodiments referencing FIGS. 10-14) or another size corresponding to the desired wheel securing axle, if needed and/or desired. Furthermore, it will be apparent to those skilled in the bicycle art from this disclosure that the bolt 80 does not necessarily have to be installed after installing the wheel securing adapter 76, or removed prior to uninstalling the wheel securing adapter 76. However, such a practice could make it easier to install/uninstall the wheel securing adapter 76 since rotation of the wheel securing adapter is permitted when the bolt 80 is removed. Moreover, following this procedure also allows the user to rotationally adjust the thread starting point of the threaded section 76d when attaching the wheel securing axle 38.

Referring still to FIGS. 3-9, the wheel securing adapter 76 will now be explained in more detail. The first adapter portion 76a is cylindrical shaped with a first maximum width or diameter D1. The second adapter portion 76b extends axially from the first adapter portion 76a. The second adapter portion 76b is also cylindrical shaped with a second maximum width or diameter D2 that is smaller than the first maximum or diameter D1 of the first adapter portion 76a to form an axially facing abutment surface 76h therebetween, as seen in FIG. 9. The external surface (i.e., an outer circumferential surface) of the first adapter portion 76a includes a plurality of circumferentially spaced apart notches or recesses 79 to form a scalloped outer circumferential surface.

Each of the recesses 79 is configured to selectively receive the enlarged head 80b therein to prevent the wheel securing adapter 76 from rotating when the wheel securing adapter 76 is in a predetermined rotational position. Thus, the bolt 80 cooperates with one of the recesses 79 to prevent the wheel securing adapter 76 from rotating relative to the outer tube 64 of the fork leg 56 in a predetermined rotational position. Because there are plurality of circumferentially spaced apart recesses 79 as mentioned above, the second adapter portion 76b is mounted into the axle mounting bore 70 of the front fork 16 so that the rotational position of the wheel securing adapter 76 is adjustable. By rotating the wheel securing adapter 76, the user can adjust the screw starting point of the skewer 38a into the wheel securing adapter 76 to a desired location. Thus, the bolt 80 cooperates with one of the recesses 79 to lock the wheel securing adapter 76 in a position with a desired screw starting point for threading the skewer 38a into the wheel securing adapter 76.

In this embodiment, the bolt 80 constitutes part of a holding member that is removably attached to the front fork 16 in accordance with the present invention. The holding member and the wheel securing adapter 76 are configured and arranged such that the holding member prevents rotation of the wheel securing adapter 76 when the wheel securing adapter 76 is mounted in the axle mounting opening 70 of the front fork 16 and engaged with the holding member. In other words, the holding member includes the bolt 80. Specifically, in this embodiment, the threaded shaft 80a forms an attachment portion of the holding member configured and arranged to be removably attached to the bicycle fork and the enlarged head 80b forms an engagement portion configured and arranged to non-rotatably engage an outer circumferential surface of the first adapter portion 76a of the wheel securing adapter 76. It will be apparent to those skilled in the art from this disclosure that the holding member can be modified if needed and/or desired. For example, the holding member can utilize a bolt similar to the bolt 80 and an additional member that forms the engagement portion, as explained in the later described embodiments referencing FIGS. 10-14.

Since the wheel securing adapter 76 reinstallable into the axle mounting bore 70, different size wheel securing adapters can be used with the front fork 16 so that different size wheel securing axles can be used, if needed and/or desired. By selecting adapters having various diameters of threaded through bores, the wheel securing skewers having various diameters can be used as needed and/or desired without changing the diameter of the axle mounting bore 70 of the front fork 16. Thus, the arrangement of the present invention allows for a single front fork to be used with different size hubs. For example, if weight savings is desired, then a user can use a hub with a wheel securing skewer having a smaller diameter. Alternatively, if a higher rigidity is desired in the hub, then a user can use a hub with a wheel securing skewer having a larger diameter. Furthermore, by rotating the adapter, the user can adjust the screw starting point of the wheel securing skewer into the adapter to a desired location. By adjusting the screw starting point of the wheel securing skewer into the adapter, it is also possible to adjust the final position of the wheel securing lever when the wheel securing lever is completely screwed in to the final fixing position. Thus, a user can adjust the final position of the wheel securing lever by rotating the adapter as he/she wants, e.g. such that the wheel securing lever does not accidentally move to the open position by contacting against a foreign object (such as rocks, immoderate undulation of ground, or the like) during a ride of a bicycle.

Referring again to FIGS. 2-9, the lower end of the outer tube 64 of the fork leg 56 will be discussed in more detail. As mentioned above, the inner sides of the lower ends of the outer tubes 60 and 64 of the fork legs 54 and 56 are provided with the cutouts 68 and 74, respectively to aid in the installation of the front hub 30. The cutout 68 is a mirror image of the cutout 74 of the lower end of the outer tube 64 of the (second) fork leg 56. Thus, only the cutout 74 of the outer tube 64 of the fork leg 56 will be discussed below. The cutouts 68 and 74 are dimensioned to at least partially mate with the ends of the tubular hub axle 36 (i.e., the enlarged contact areas on the stepped tubular part 36a and the washer part 36b), which also contributes to reduced axial contact pressure between the front fork 16 and the tubular hub axle 36. Thus, the chance of potential damage to the front fork 16 can be effectively reduced and a very rigid, strong holding/supporting connection between the front hub 30 and the front fork 16, even if the front hub 30 is very tightly secured to the front fork 16, even after extended use.

Referring now to FIG. 9, the cutout 74 surrounds the axle mounting bore 70 on the inner side surface of the outer tube 64 of the fork leg 56 that faces the lower end of the outer tube 60 of the fork leg 54. The cutout 74 is basically defined by an end abutment or inner stepped surface 74a and a peripheral abutment surface 74b with an insertion opening 74c being formed at the lower end of the cutout 74. The end abutment surface 74a constitutes a first axial abutment surface that is configured to directly abut against an exposed hub axle end face of the tubular hub axle 36 (i.e., the washer part 36b). The peripheral abutment surface 74b constitutes a second lateral abutment surface that is configured to directly abut against an exposed hub axle side face of the tubular hub axle 36 (i.e., the free end of the stepped tubular part 36a). The end abutment surface 74a and the peripheral abutment surface 74b form an inner stepped portion of the cutout 74. The insertion opening 74c is basically a break in the peripheral surface 74b to allow insertion of the exposed hub axle end of the tubular hub axle 36 into the cutout 74. With such an arrangement, rigidity when the front fork 16 and the hub 30 are assembled is improved because of the presence of two abutment surfaces at each lower end of the fork 16. To further improve assembly, the cutout 74 is preferably provided with a tapered guide surface 74d that defines a tapered guide portion of the insertion opening 74c. The tapered guide portion (the tapered guide surface 74d) is configured for easy insertion (axial alignment in particular) of the tubular hub axle 36 into the inner stepped portion of the cutout 74 from a direction parallel to the longitudinal axis of the fork leg 56. It will be apparent to those skilled in the bicycle art from this disclosure that the cutouts 68 and 74 can be replaced with cutouts like those in the following embodiments referencing FIGS. 10-14, as explained below.

The front fork 16, the skewer 16, the wheel securing adapter 76 with the O-ring 77 and the bolt 80 constitute parts of a wheel securing structure in accordance with the present invention. In other words, the wheel securing adapter 76, the axial retaining arrangement and the holding member (parts of the wheel securing structure) cooperate with part of the front fork 16 and the skewer 38 to securely attach the front wheel 18 to the front fork 16.

Second Embodiment

Referring now to FIGS. 10 to 12, parts of a modified wheel securing structure in accordance with a second embodiment of the present invention will now be explained. The wheel securing structure of this second embodiment includes a modified wheel securing adapter 176 or 176', a modified outer tube 164 of the fork leg 156 and a modified holding member. The wheel securing adapters 176 or 176' are identical to each other except they have different sized internal bores 176c and 176c', respectively. Each of the wheel securing adapters 176 or 176' is a one-piece, unitary member that are formed of a hard rigid material. Preferably, the material of the wheel securing adapters 176 and 176' is harder than the material of the outer tube 164 of the fork leg 156.

The wheel securing adapter 176 includes a first adapter portion 176a and a second adapter portion 176b with an internally threaded bore 176c extending completely through both the first and second adapter portions 176a and 176b. The external surface of the second adapter portion 176b has an externally threaded surface 177 in place of the annular groove 76g and the O-ring 77 of the first embodiment. The wheel securing adapter 176 is threadedly mounted in a threaded axle mounting opening 170 of the outer tube 164 so that the rotational position of the adapter 176 is adjustable. Furthermore, by rotating the wheel securing adapter 176, the user can adjust the screw starting point of a modified skewer 138a (with a threaded end 138b) into the wheel securing adapter 176 to a desired location. The threaded connection between the second adapter portion 176b and the mounting opening 170 constitutes an axial retaining arrangement in accordance with this second embodiment of the present invention.

The first adapter portion 176a has plurality of circumferentially spaced apart notches or recesses 179 like the first embodiment. The recesses 179 selectively receive a locking or holding tab 182 therein to prevent the wheel securing adapter 176 from unthreading (rotating). The holding tab 182 is attached to the outer tube 164 using a bolt 180 having a threaded shaft and an enlarged head like the bolt 80 of the first embodiment. In this embodiment, the bolt 180 and the holding tab 182 constitute parts of a holding member in accordance with this second embodiment of the present invention. Thus, the locking tab 182 forms and engagement portion of the holding member that cooperates with one of the recesses 179 to prevent the wheel securing adapter 176 from rotating relative to the outer tube 164 of the fork leg 156.

The lower end of the outer tube 164 has a stepped configuration that is different than the in the first embodiment. The holding member (i.e., the bolt 180 and the holding tab 182) of this second embodiment is particularly useful when such a stepped lower end is utilized. Even if a stepped lower end is not utilized, a two-part holding member similar to this embodiment may be utilized, as discussed below with reference to the third embodiment. The lower end of the outer tube 164 further includes a cutout 174 that is a modified version of the cutout 74 of the first embodiment. The cutouts 68 and 74 of the first embodiment may be replaced with cutouts configured like the cutout 174 if needed and/or desired.

The cutout 174 surrounds the axle mounting bore 170 on the inner side surface of the outer tube 164 of the fork leg 156 that faces the opposite fork leg *not shown). The cutout 174 is basically defined by an end abutment or inner stepped surface 174a and a peripheral abutment surface 174b with an insertion opening 174c being formed at the lower end of the cutout 174. The end abutment surface 174a constitutes a first axial abutment surface that is configured to directly abut against an exposed hub axle end face of a modified hollow hub axle 136. Preferably, the ends of the outer hollow axle are sized like the first embodiment so that the cutout 174 is sized like the cutouts 68 and 74 of the first embodiment. However, it will be apparent to those skilled in the art from this disclosure that various sizes of cutouts 68, 74 and 174 may be provided depending on the hub.

The peripheral abutment surface 174b constitutes a second lateral abutment surface that is configured to directly abut against an exposed hub axle side face of the hollow hub axle 136. The end abutment surface 174a and the peripheral abutment surface 174b form an inner stepped portion of the cutout 174. The insertion opening 174c is basically a break in the peripheral surface 174b to allow insertion of the exposed hub axle end of the hollow hub axle 136 into the cutout 174. With such an arrangement, like the first embodiment rigidity of the assembled structure is improved because of the presence of two abutment surfaces. To further improve assembly, the cutout 174 is also preferably provided with three tapered guide surfaces 174d, 174e and 174f that define a tapered guide portion of the insertion opening 174c. The tapered guide portion (the tapered guide surfaces 174d, 174e and 174f) is configured for easy insertion of the hollow hub axle 136 into the inner stepped portion of the cutout 174 from a direction parallel to the longitudinal axis of the outer tube 164.

The tapered guide surfaces 174d and 174f constitute a pair of opposed end guide surfaces and the tapered guide surface 174e constitute a central guide surface extending between the tapered guide surfaces 174d and 174f (i.e., the opposed end guide surfaces). The tapered guide surfaces 174d and 174f (i.e., the opposed end guide surfaces) are inclined relative to the lower edges of the peripheral surface 174b (i.e., the second lateral abutment surface). The tapered guide surface 174e (i.e., the central guide surface) is inclined relative to the inner stepped surface 174a (i.e., the first axial abutment surface).

As seen in FIG. 12, since the wheel securing adapter 176 reinstallable into the axle mounting bore 170, different size wheel securing adapters can be used so that different size wheel securing axles can be used. For example, the additional wheel securing adapter 176' illustrated includes a first adapter portion 176a' with recesses 179' and a second adapter portion 176b' with an internally threaded bore 176c' extending completely therethrough. The external surface of the second adapter portion 176b' has an externally threaded surface 177' in place of the annular groove 76g and the O-ring 77 of the first embodiment. The additional wheel securing adapter 176' is identical to the wheel securing adapter 176, except that the internally threaded bore 176c' has a larger diameter than the through bore 176c. It will be apparent to those skill in the bicycle art from this disclosure that the one or more of the features of the this second embodiment can be used in place of corresponding features of the first embodiment if needed and/or desired, and vice versa. Accordingly, this second embodiment will not be explained in further detail herein.

Third Embodiment

Referring now to FIGS. 13 and 14, parts of a modified wheel securing structure in accordance with a third embodiment of the present invention will now be explained. The wheel securing structure of this third embodiment includes modified outer tube 264 and a modified holding tab 282. Otherwise, this third embodiment is identical to the second embodiment. Accordingly, this third embodiment is illustrated in conjunction with the wheel securing adapter 176, the hollow hub axle 136, and the skewer 138a (with the threaded end 138b) of the second embodiment, and like reference numerals will be used for like parts. Alternatively, the wheel securing adapter 176' may be used. The modified outer tube 264 does not have a stepped configuration like the second embodiment. Thus, the modified holding tab 282 is not stepped. However, the modified outer tube 264 has a threaded bore 270 like the threaded bore 170 so that the wheel securing structure of this third embodiment is used in conjunction with the skewer 138*a* (with the threaded end 138*b*) of the second embodiment. Also, the modified outer tube 264 has a cutout 274 like the cutout 174 of the second embodiment so that the wheel securing structure of this third embodiment is used in conjunction with the hollow hub axle 136. It will be apparent to those skill in the bicycle art from this disclosure that the one or more of the features of the this third embodiment can be used in place of corresponding features of the first and/or second embodiments if needed and/or desired, and vice versa. Accordingly, this third embodiment will not be explained in further detail herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle wheel securing structure comprising:
    a bicycle fork having a first axle support portion with a first axle mounting opening and a second axle support portion, each of the first and second axle support portions having an inner side surface and an outer side surface, with the inner side surfaces of the first and second axle support portions facing each other and the outer side surfaces of the first and second axle support portions facing in opposite directions away each other:
    an adapter including
        a first portion having a first maximum width, the first portion being disposed on the outer side surface of the first axle support portion,
        a second portion extending axially from the first portion, the second portion having a second maximum width that is smaller than the first maximum width of the first portion to form an axially facing abutment surface between the first and second portions, the second portion mounted in the first axle mounting opening of the bicycle fork, and
        an axial bore extending from a second end face of the second portion that is at least partially threaded;
    an axial retaining arrangement disposed between the second portion of the adapter and the mounting opening to axially retain the adapter in the mounting opening; and
    a holding member attached to the bicycle fork, the holding member and the adapter being configured and arranged such that the holding member prevents rotation of the adapter when the adapter is mounted in the axle mounting opening of the bicycle fork and engaged with the holding member.

2. The bicycle wheel securing structure according to claim 1, wherein
    the axial retaining arrangement includes an O-ring.

3. The bicycle wheel securing structure according to claim 2, wherein
    the O-ring is constructed of an elastomeric material.

4. The bicycle wheel securing structure according to claim 3, wherein
    the O-ring is constructed of rubber.

5. The bicycle wheel securing structure according to claim 2, wherein
    the second portion of the adapter has an annular groove with the O-ring disposed therein such that the O-ring projects at least partially radially outwardly from an outer surface of the second portion of the adapter to contact an internal surface of the axle mounting opening when the second portion of the adapter is mounted in the axle mounting opening.

6. The bicycle wheel securing structure according to claim 5, wherein
    the outer surface of the second portion of the adapter is non-threaded along an entire axial length of the second portion.

7. The bicycle wheel securing structure according to claim 5, wherein
    the holding member includes an attachment portion configured and arranged to be removably attached to the bicycle fork and an engagement portion configured and arranged to non-rotatably engage an outer circumferential surface of the first portion of the adapter.

8. The bicycle wheel securing structure according to claim 1, wherein
    the holding member includes an attachment portion configured and arranged to be removably attached to the bicycle fork and an engagement portion configured and arranged to non-rotatably engage an outer circumferential surface of the first portion of the adapter.

9. The bicycle wheel securing structure according to claim 8, wherein
    the holding member includes a bolt configured and arranged to be threadedly attached to a threaded mounting opening of the bicycle fork.

10. The bicycle wheel securing structure according to claim 9, wherein
    the bolt includes a threaded shaft that forms the attachment portion of the holding member, and an enlarged head that forms the engagement portion of the holding member.

11. The bicycle wheel securing structure according to claim 10, wherein
    the outer circumferential surface of the first portion of the adapter has a plurality of circumferentially spaced recesses, each recess being configured and arranged to selectively receive the enlarged head of the bolt at least partially therein in a predetermined rotational position.

12. The bicycle wheel securing structure according to claim 8, wherein the outer circumferential surface of the first portion of the adapter has a plurality of circumferentially spaced recesses, each recess being configured and arranged to selectively receive the engagement portion at least partially therein in a predetermined rotational position.

13. The bicycle wheel securing structure according to claim 1, wherein the axial bore is a through bore extending from a first end face of the first portion to the second end face of the second portion.

14. A bicycle wheel securing structure comprising:

an adapter including a first portion having a first maximum width, a second portion extending axially from the first portion, the second portion having a second maximum width that is smaller than the first maximum width of the first portion to form an axially facing abutment surface between the first and second portions, the second portion being configured and arranged to be mounted in an axle mounting opening of a bicycle fork, and a through bore extending from a first end face of the first portion to a second end face of the second portion with the through bore including a threaded section disposed in an area spaced from the second end face and an unthreaded section disposed between the threaded section and the second end face;

an axial retaining arrangement disposed between the second portion of the adapter and the mounting opening to axially retain the adapter in the mounting opening; and a holding member attached to the bicycle fork, the holding member and the adapter being configured and arranged such that the holding member prevents rotation of the adapter when the adapter is mounted in the axle mounting opening of the bicycle fork and engaged with the holding member.

\* \* \* \* \*